United States Patent
Chu

(10) Patent No.: US 8,089,591 B2
(45) Date of Patent: Jan. 3, 2012

(54) LIQUID CRYSTAL DISPLAY DEVICE AND METHOD OF ALIGNING LIQUID CRYSTAL MOLECULES UTILIZED THEREBY

(75) Inventor: Kuei-Lin Chu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 462 days.

(21) Appl. No.: 12/353,333

(22) Filed: Jan. 14, 2009

(65) Prior Publication Data

US 2010/0118234 A1    May 13, 2010

(30) Foreign Application Priority Data

Nov. 10, 2008   (CN) .......................... 2008 1 0305468

(51) Int. Cl.
  *G02F 1/1337*   (2006.01)
  *G02F 1/139*    (2006.01)
(52) U.S. Cl. ......... 349/114; 349/119; 349/136; 349/191
(58) Field of Classification Search .............. 349/88, 349/114, 119, 136, 187, 191, 93, 132, 183; 430/321
See application file for complete search history.

(56) References Cited

U.S. PATENT DOCUMENTS

| | | | | |
|---|---|---|---|---|
| 6,157,425 | A | * | 12/2000 | Kuo et al. ................. 349/88 |
| 2001/0048496 | A1 | * | 12/2001 | Baek .......................... 349/114 |
| 2004/0032555 | A1 | * | 2/2004 | Jin et al. ..................... 349/114 |
| 2007/0046869 | A1 | * | 3/2007 | Lin et al. ..................... 349/114 |
| 2008/0014372 | A1 | * | 1/2008 | Lin et al. ..................... 428/1.1 |
| 2009/0174851 | A1 | * | 7/2009 | Chen et al. .................. 349/128 |

FOREIGN PATENT DOCUMENTS

| CN | 1670595 A | 9/2005 |
|---|---|---|
| CN | 201035278 Y | 3/2008 |

* cited by examiner

*Primary Examiner* — David Nelms
*Assistant Examiner* — Tai Duong
(74) *Attorney, Agent, or Firm* — Altis Law Group, Inc.

(57) ABSTRACT

A liquid crystal device includes a pair of substrates with at least one liquid crystal cell therebetween, filled with a mixture of an alignment solution and liquid crystal molecules. The liquid crystal molecules are exposed to UV rays and a first voltage is applied to the pair of substrates to form a polymer network in each of the liquid crystal cells. Thus, the liquid crystal molecules achieve a bend state without transiting from a splay state. Further, a method of aligning the liquid crystal molecules is provided.

13 Claims, 9 Drawing Sheets

LIQUID CRYSTAL DISPLAY DEVICE AND METHOD OF ALIGNING LIQUID CRYSTAL MOLECULES UTILIZED THEREBY

BACKGROUND

1. Technical Field

The present disclosure relates to liquid crystal display, and particularly to a liquid crystal display device and method of aligning liquid crystal molecules utilized by the device.

2. Discussion of the Related Art

Liquid crystal display (LCD) devices have come into widespread use in recent years because of their advantages such as thinner profile and lower power consumption. To enhance response time and expand viewing angle, optically compensated bend-mode liquid crystal displays (OCB-LCD) have been developed.

However, it takes a relatively long period for liquid crystal molecules between a pair of substrates of the OCB-LCD device to reach a bend state so as to begin operation. Initially, the liquid crystal molecules are in a splay state when no voltage is applied. With application of voltage, the liquid crystal molecules transit from the splay state to an asymmetric splay state, then to the bend state when the voltage reaches a bend level.

Therefore, a method of aligning liquid crystal molecules and liquid crystal display utilizing the method are desired.

BRIEF DESCRIPTION OF THE DRAWINGS

Many aspects of the disclosure can be better understood with reference to the following drawings. The components in the drawings are not necessarily to scale, the emphasis instead being placed upon clearly illustrating the principles of the disclosure. Moreover, in the drawings, like reference numerals designate corresponding parts throughout the several views.

DETAILED DESCRIPTION OF THE EMBODIMENTS

Figure 1:
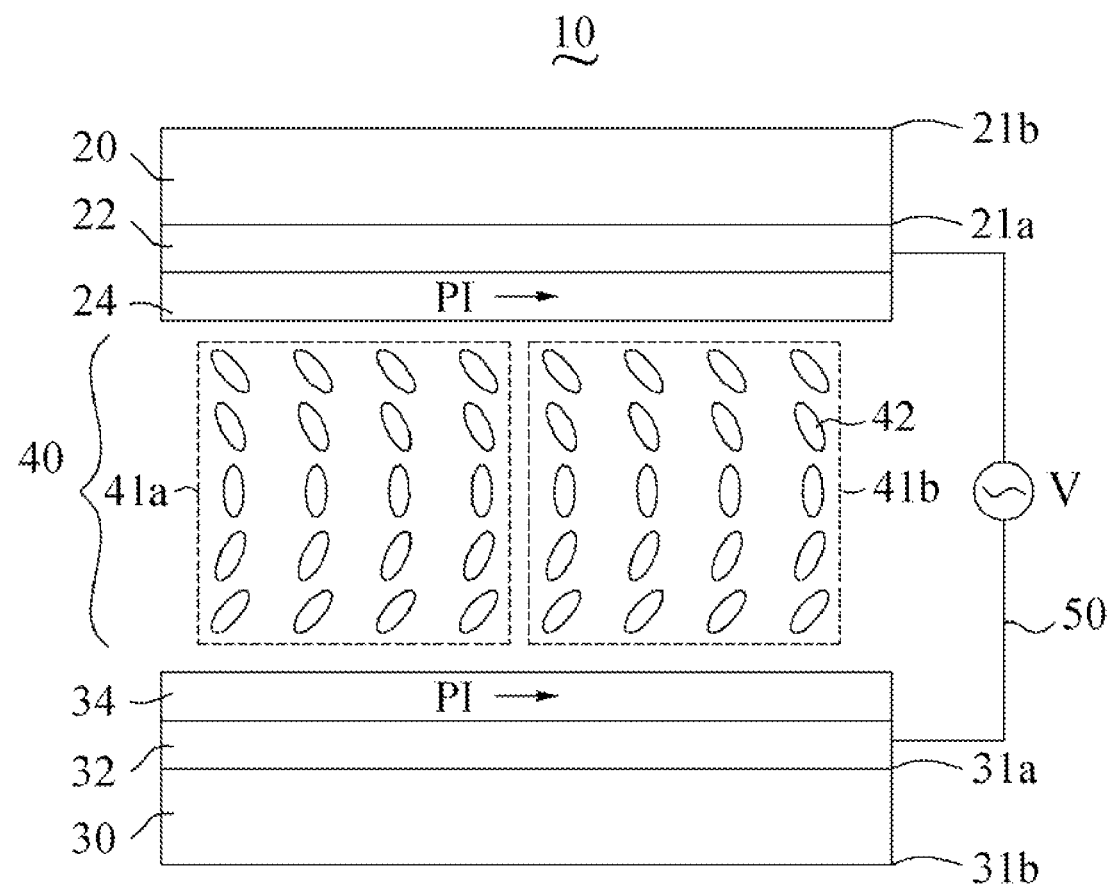
FIG. 1 is a partially schematic view of an embodiment of a liquid crystal device.

FIG. 1 schematically shows a liquid crystal device 10 including a first substrate 20, a second substrate 30, a liquid crystal layer forming by a plurality of liquid crystal cells 40, and a driving circuit 50. The second substrate 30 has a second surface 31a opposite to a first surface 21a of the first substrate 20. Each of the liquid crystal cells 40 includes a transmissive area 41a and a reflective area 41b.

The first substrate 20 successively forms a first electrode 22 and a first alignment film 24 on the first surface 21a. The second substrate 30 successively forms a second electrode 32 and a second alignment film 34 on the second surface 31a. The liquid crystal cells 40 are arranged between the first alignment film 24 and the second alignment film 34, and are configured (structured and arranged) for being filled with a plurality of liquid crystal molecules 42.

In this embodiment, the first electrode 22 and the second electrode 32 are indium tin oxide (ITO) glass, and the first electrode 22 and the second electrode 32 are polyimide (PI) film. It is to be noted that rubbing directions of the PI films are parallel.

Figure 2A:
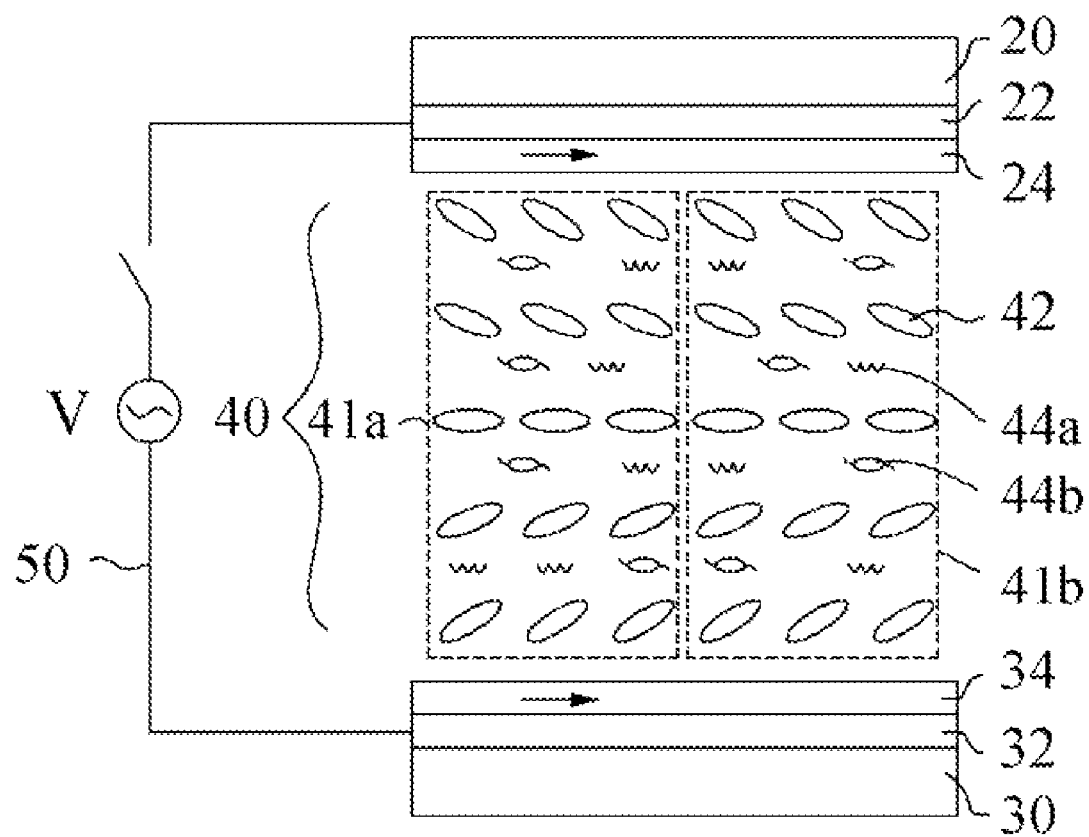
FIGS. 2A through 2E are schematic views illustrating alignment transitions of liquid crystal molecules of the liquid crystal device of FIG. 1.

FIGS. 2A through 2E are schematic views illustrating the alignment transitions of the liquid crystal molecules 42. An alignment solution is provided, including two kinds of monomers 44a, 44b mixed together. The monomers 44a, 44b include a side-chain polymer 44a and a photo-curable polymer 44b. The ratio of the side-chain polymer 44a to the photo-curable polymer 44b is approximately 1:2 to 1:3. As shown in FIG. 2A, the transmissive area 41a and the reflective area 41b of the liquid crystal cells 40 are filled with a mixture of the alignment solution and the liquid crystal molecules 42. Here, the weight percentage of the alignment solution of the mixture is approximately 3% to 7%.

Figure 2B:
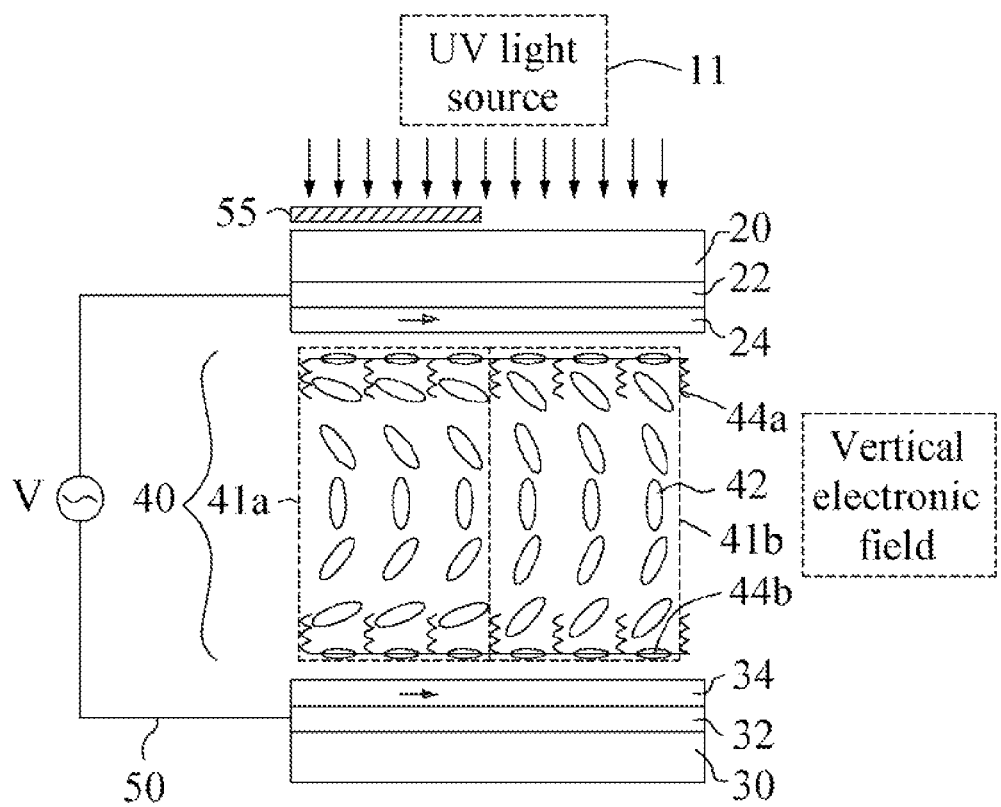

Also referring to FIG. 2B, the driving circuit 50 applies a first voltage to the first substrate 20 and the second substrate 30. In the embodiment, the first voltage is an alternating current voltage, approximately 5V to 9V. The first voltage generates a vertical electronic field between the first electrode 22 and the second electrode 32, vertically aligning the liquid crystal molecules 42. It is to be noted that the side-chain polymer 44a and the photo-curable polymer 44b are not affected by the vertical electronic field, but the alignment of the side-chain polymer 44a will be pulled up by the liquid crystal molecules 42.

In addition, ultra-violet (UV) light source 11 irradiates liquid crystal cells 40 when the first voltage is applied to the first substrate 20 and the second substrate 30. As shown in FIG. 2B, a mask 55 is provided between the transmissive area 41a and the UV light source 11. The mask 55 is removed after a first time period, and the transmissive area 41a and the reflective area 41b are simultaneously irradiated by UV light source 11 for a second time period.

Figure 2C:
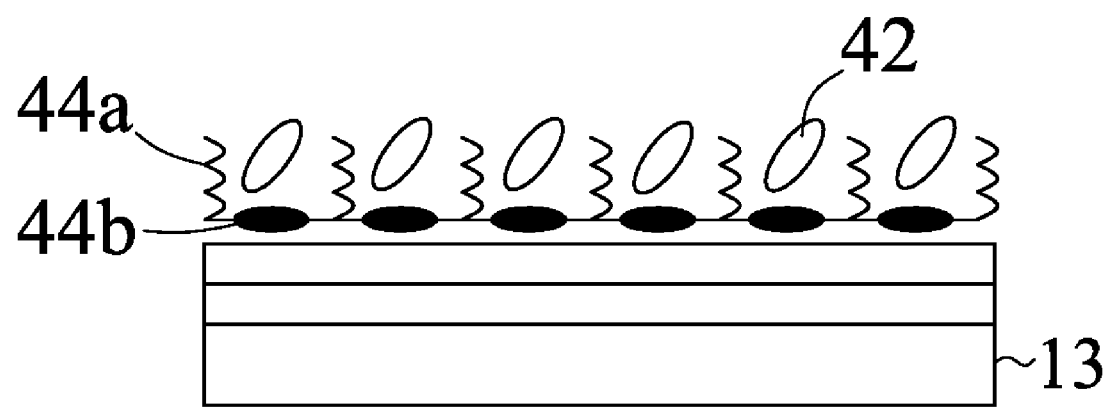

In this embodiment, the UV rays have a uniform wavelength of about 254 nanometers (nm), about 302 nm, and about 365 nm. Alternatively, the UV light can have wavelengths of about 400 nm or less. Understandably, the alignment of the side-chain polymer 44a is affected by the time period during which the side-chain polymer 44a is exposed to the UV light source 11. In other words, the angle between the side-chain polymer 44a and the first and second alignments film 24, 34 is close to approximately 90 degrees (°) when the side-chain polymer 44a has been exposed to the UV light source 11 for a sufficient period. At the same time, the photo-curable polymer 44b is substantially parallel to the first and second alignment films 24, 34 for exposure to the UV light source 11. The alignment of the side-chain polymer 44a and the photo-curable polymer 44b are shown in FIG. 2C. Thus, the side-chain polymer 44a and the photo-curable polymer 44b cooperatively form a polymer network to control a pretilt angle of the liquid crystal molecules 42.

Figure 2D:
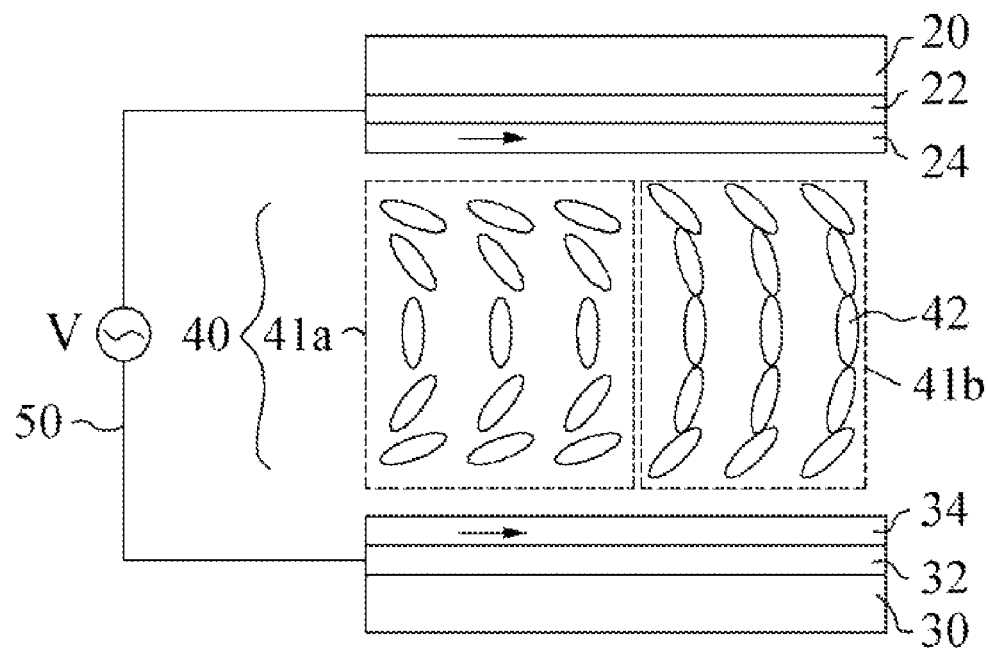

In the embodiment, the pretilt angle of the liquid crystal molecules 42 of the transmissive area 41a is controlled within approximately 54° to 60°. After removing the applied voltage and the UV light source 11, as shown in FIG. 2D, the liquid crystal molecules 42 are in a bend state as expected. The pretilt angle of the liquid crystal molecules 42 of the reflective area 41b is controlled within approximately 65° to 70°. Thus, the pretilt angle of the liquid crystal molecules 42 of the reflective area 41b exceeds the pretilt angle of the liquid crystal molecules 42 of the transmissive area 41a.

Figure 2E:
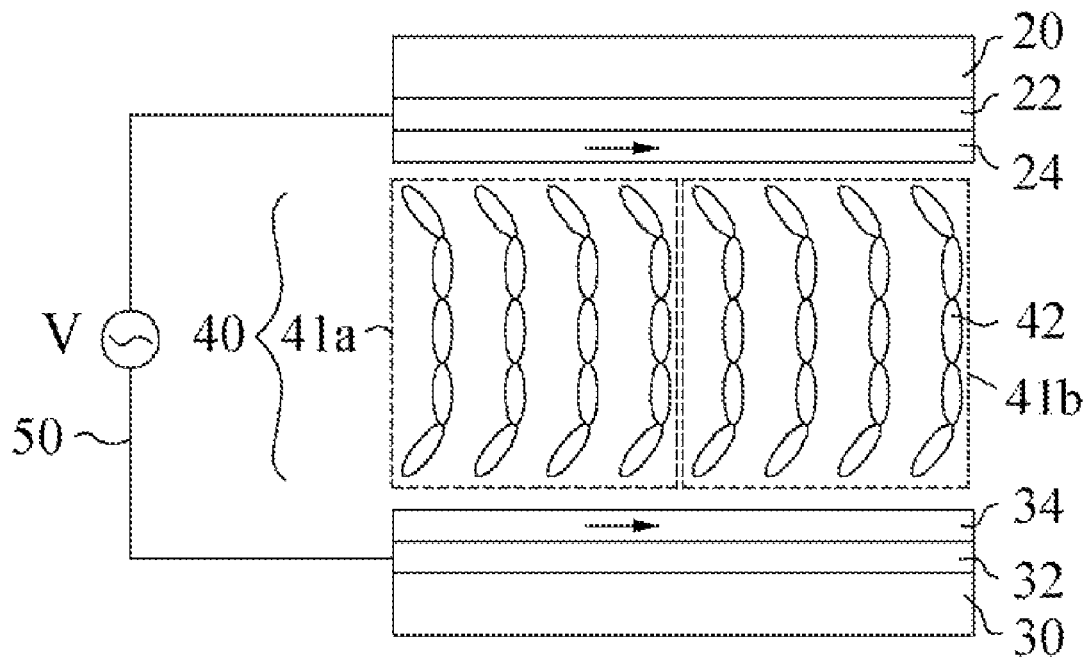

A second voltage is applied to the first substrate 20 and the second substrate 30 when the liquid crystal molecules 42 are in the bend state. An initial value of the second voltage is approximately 0V. The second voltage is then gradually increased until reaching a saturated voltage (Vsat). Finally, the alignment of the liquid crystal molecules 42 is as shown in FIG. 2E.

Figure 3:
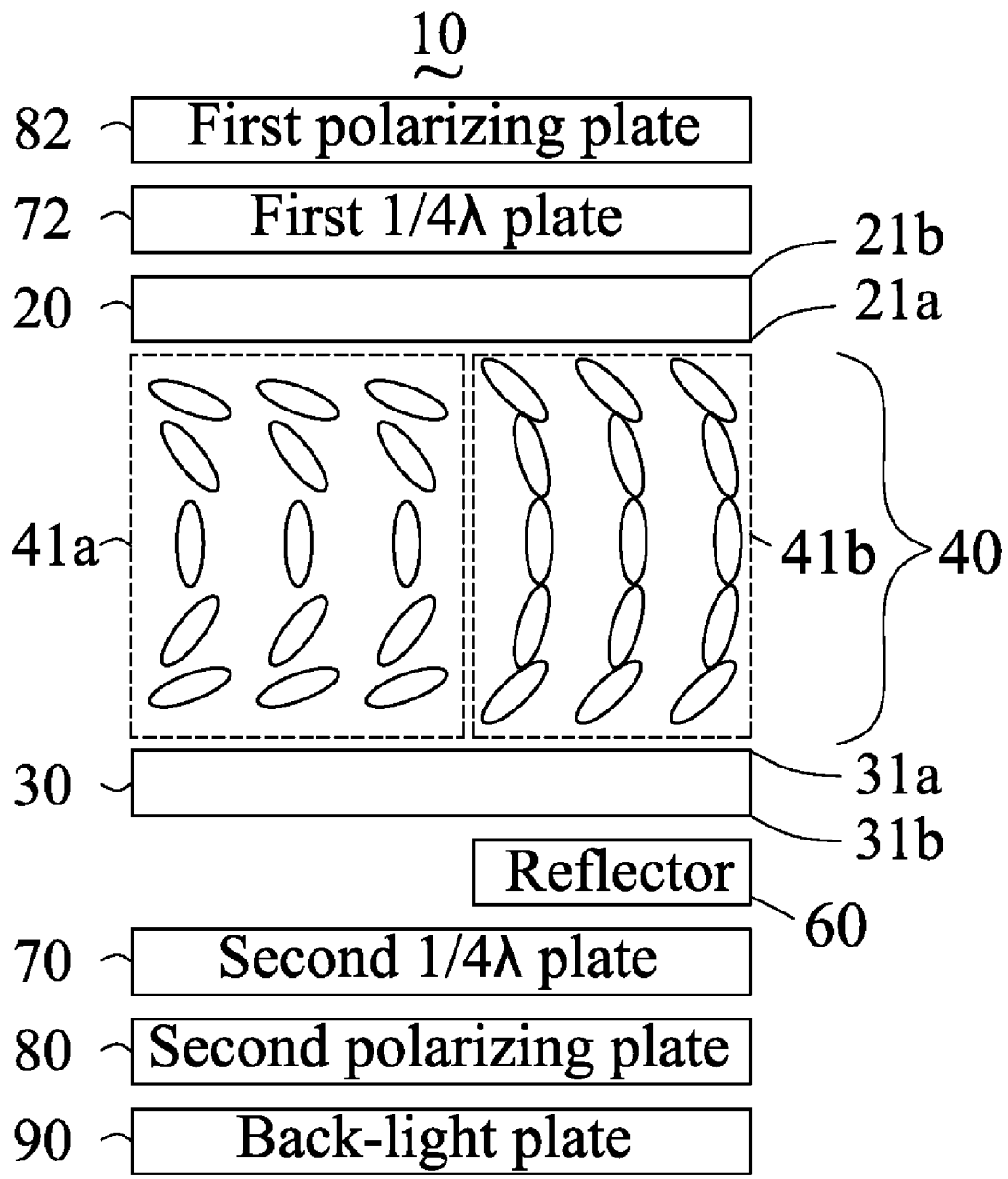
FIG. 3 is a schematic view of the liquid crystal device of FIG. 1.

FIG. 3 is a schematic view of the liquid crystal device 10, which includes, in addition to the first substrate 20, the second substrate 30 and the liquid crystal cells 40 as described, a first quarter-wavelength (¼λ) plate 72, a first polarizing plate 82, a second ¼λ plate 70, a second polarizing plate 80 and a back-light plate 90. The first ¼λ plate 72 and the first polarizing plate 82 are successively arranged in a second surface 21*b* of the first substrate 20. The second ¼λ plate 70, the second polarizing plate 80, and the back-light plate 90 are successively arranged in the first surface 31*b* of the second substrate 30. In addition, the liquid crystal device 10 also includes a reflector 60 arranged between the second ¼λ plate 70 and the reflective area 41*b*.

Figure 4:
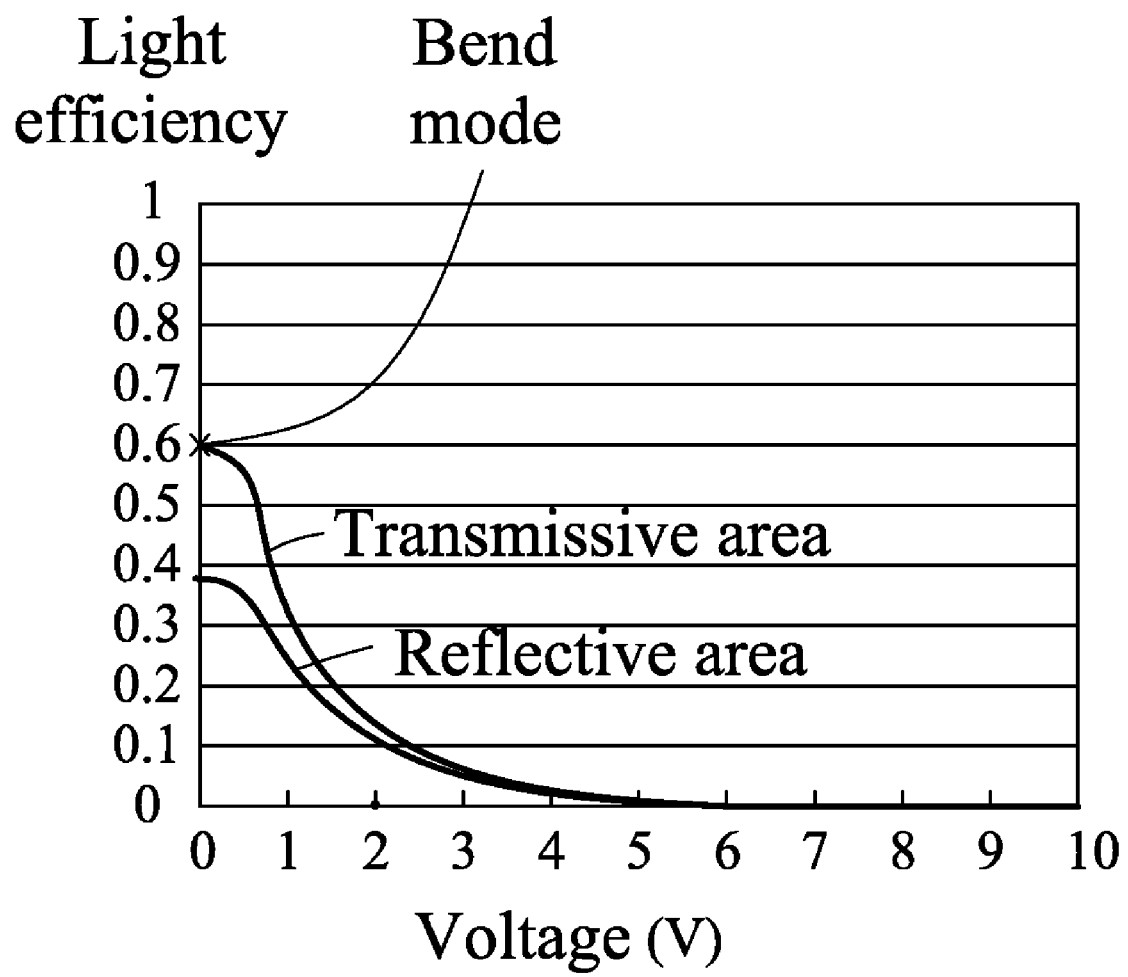
FIG. 4 shows a relationship between the applied voltage, the light efficiency of the transmissive area and the reflective area of the liquid crystal device of FIG. 1.

Here, the saturated voltage is approximately 6V (as shown in FIG. 4). Thus, the operating voltage of the liquid crystal device 10 is approximately 0 to 6V after the liquid crystal device 10 is turned on.

Figure 5:
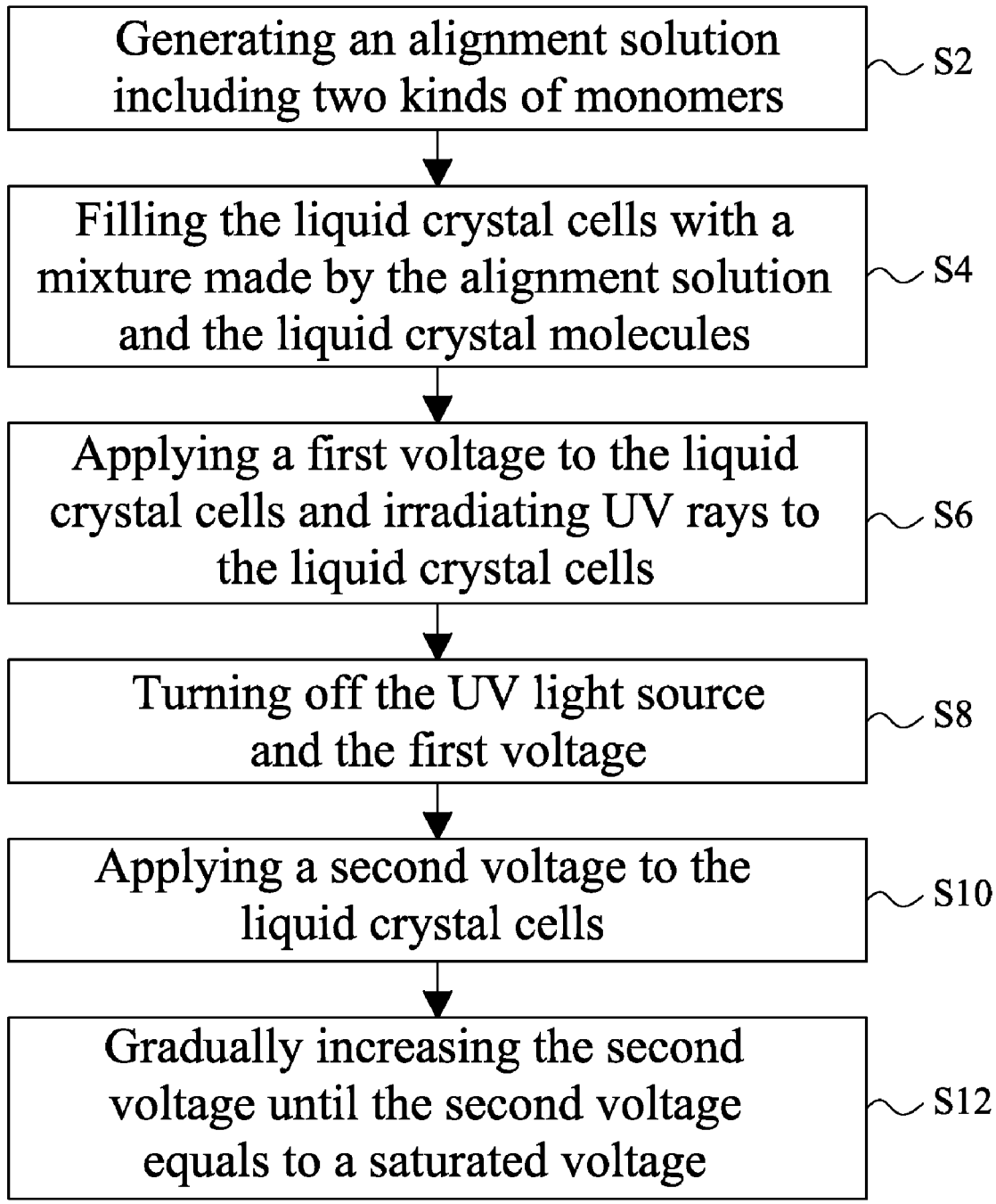
FIG. 5 shows a method of aligning liquid crystal molecules according to the disclosure.

FIG. 5 is a flowchart illustrating a method for manufacturing a liquid crystal device 10 according to the disclosure. In block S2, an alignment solution including two kinds of monomers is generated. In block S4, the liquid crystal cells 40 are filled with a mixture of the alignment solution and the liquid crystal molecules 42. In block S6, a first voltage is applied to the liquid crystal cells 40 and the UV light source 11 irradiates the liquid crystal cells 40 until the polymer network is formed. It is to be noted that a mask 55 is provided between the UV light source 11 and the transmissive area 41*a* for a first time period. After the time period, the mask 55 is removed and the transmissive area 41*a* and the reflective area 41*b* are simultaneously exposed to the UV light source 11. In block S8, the UV light source 11 and the first voltage are turned off. At this time, the liquid crystal molecules 42 are in a bend state.

In block S10, a second voltage is applied to the liquid crystal cells 40. The initial value of the second voltage is approximately 0V. In block S12, the second voltage is then gradually increased until reaching a saturated voltage (Vsat).

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal device comprising:
   a first substrate comprising a first surface;
   a second substrate comprising a second surface opposite to the first surface of the first substrate;
   a first electrode and a first alignment film successively formed on the first surface of the first substrate;
   a second electrode and a second alignment film successively formed on the second surface of the second substrate;
   at least one liquid crystal cell between the first substrate and the second substrate, wherein each of the at least one liquid crystal cells comprises a transmissive area and a reflective area filled with a mixture of an alignment solution and liquid crystal molecules, a pretilt angle of the liquid crystal molecules of the transmissive area being about 54° to 60°, and a pretilt angle of the liquid crystal molecules of the reflective area being about 65° to 70°; and
   wherein a polymer network is formed in each of the at least one liquid crystal cells after the liquid crystal molecules are exposed to UV rays and the first substrate and the second substrate receive a first voltage, such that the liquid crystal molecules achieve a bend state without transiting from a splay state.

2. The device as claimed in claim 1, wherein the first substrate and the second substrate are glass substrates coated with indium tin oxide.

3. The device as claimed in claim 1, wherein the first alignment film and the second alignment film are polyimide films, rubbing directions of the polyimide films are parallel.

4. The device as claimed in claim 1, wherein the alignment solution comprises a side-chain polymer and a photo-curable polymer, and the ratio of the side-chain polymer to the photo-curable polymer is approximately 1:2 to 1:3.

5. The device as claimed in claim 4, wherein the weight percentage of the alignment solution of the mixture is approximately 3% to 7%.

6. The device as claimed in claim 1, wherein the liquid crystal device further comprises a first quarter-wavelength plate and a first polarizing plate successively arranged in a second surface of the first substrate, and a second quarter-wavelength plate and a second polarizing plate successively arranged in a first surface of the second substrate.

7. A method of aligning liquid crystal molecules in a liquid crystal device comprising a plurality of liquid crystal cells between a first substrate and a second substrate, the method comprising:
   providing an alignment solution comprising a side-chain polymer and a photo-curable polymer;
   filling the liquid crystal cells with a mixture comprising the alignment solution and liquid crystal molecules; and
   irradiating the liquid crystal cells with UV rays from a UV light source and applying a first voltage to the liquid crystal cells until a polymer network is formed in each of the liquid crystal cells, so that the liquid crystal molecules achieve a bend state without transiting from a splay state.

8. The method as claimed in claim 7, wherein each of the liquid crystal cells comprises a transmissive area and a reflective area, and providing an alignment solution further comprises:
   providing a mask between the transmissive area and the UV light source; and removing the mask after the reflective area is exposed to the UV light source for a first time period.

9. The method as claimed in claim 7, wherein the ratio of the side-chain polymer to the photo-curable polymer is approximately 1:2 to 1:3.

10. The method as claimed in claim 9, wherein the weight percentage of the alignment solution of the mixture is approximately 3% to 7%.

11. The method as claimed in claim 7, wherein the first voltage is approximately 5V to 9V.

12. The method as claimed in claim 7, wherein the UV rays radiated from the UV light source are of a wavelength less than about 400 nm.

13. The method as claimed in claim 12, wherein the wavelength of the UV rays radiated is 254 nm, 302 nm, or 365 nm.

* * * * *